(12) United States Patent
Waters et al.

(10) Patent No.: US 7,948,124 B1
(45) Date of Patent: May 24, 2011

(54) ELECTRO-MAGNETIC KINETIC ENERGY HARVESTING DEVICE USING INCREASED MAGNETIC EDGE AREA

(75) Inventors: Richard Waters, San Diego, CA (US); Mark Fralick, San Diego, CA (US); Hugo Jazo, San Diego, CA (US); Brian Dick, San Diego, CA (US); Max Kerber, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 65 days.

(21) Appl. No.: 12/563,932

(22) Filed: Sep. 21, 2009

Related U.S. Application Data

(63) Continuation-in-part of application No. 12/360,892, filed on Jan. 28, 2009, now Pat. No. 7,692,340.

(51) Int. Cl.
*H02K 35/00* (2006.01)
(52) U.S. Cl. .......................................... 310/36
(58) Field of Classification Search .............. 310/15, 310/36, 40 MM
See application file for complete search history.

(56) References Cited

U.S. PATENT DOCUMENTS

| | | | |
|---|---|---|---|
| 5,341,055 A * | 8/1994 | Roche | 310/24 |
| 6,570,824 B1 * | 5/2003 | Born | 368/203 |
| 6,768,230 B2 | 7/2004 | Cheung et al. | |
| 6,936,937 B2 | 8/2005 | Tu et al. | |
| 6,984,902 B1 | 1/2006 | Huang et al. | |
| 7,309,934 B2 | 12/2007 | Tu et al. | |
| 7,569,952 B1 | 8/2009 | Bono et al. | |
| 7,586,220 B2 | 9/2009 | Roberts | |
| 2002/0172060 A1 * | 11/2002 | Takeuchi | 363/110 |
| 2007/0282378 A1 | 12/2007 | Huang et al. | |
| 2008/0116856 A1 | 5/2008 | Roberts et al. | |
| 2008/0246346 A1 | 10/2008 | Harris et al. | |
| 2008/0278008 A1 | 11/2008 | Roberts et al. | |

OTHER PUBLICATIONS

S. P. Beeby, R. N. Torah, M. J. Tudor, P. Glynne-Jones, T. O'Donnell, C. R. Saha, and S. Roy; A micro electromagnetic generator for vibration energy harvesting; IOP Publishing Ltd, J. Micromech. Microeng. 17, pp. 1257-1265; Jun. 5, 2007.

* cited by examiner

*Primary Examiner* — Nguyen N Hanh
(74) *Attorney, Agent, or Firm* — Kyle Eppele; J. Eric Anderson

(57) ABSTRACT

An energy harvesting apparatus comprising: a substrate; two magnets coupled to the substrate in close proximity to each other with like magnetic poles facing each other creating a flux gap; a coil coupled to the substrate and disposed within the flux gap, wherein the coil and the magnets are coupled to the substrate such that substrate acceleration causes relative motion between the magnets and the coil thereby exposing the coil to a changing magnetic flux.

19 Claims, 11 Drawing Sheets

Fig. 9a  Fig. 9b

ELECTRO-MAGNETIC KINETIC ENERGY HARVESTING DEVICE USING INCREASED MAGNETIC EDGE AREA

CROSS-REFERENCE TO RELATED APPLICATION

This application is a continuation-in-part of U.S. application Ser. No. 12/360,892, filed 28 Jan. 2009 now U.S. Pat. No. 7,692,340, entitled "An Apparatus for Generating Power Responsive to Mechanical Vibration" (Navy Case # 99735), hereby incorporated by reference herein in its entirety for its teachings, and referred to hereafter as "the parent application."

FEDERALLY-SPONSORED RESEARCH AND DEVELOPMENT

This invention is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619) 553-2778; email T2@spawar.navy.mil. Reference Navy Case Number 99741.

BACKGROUND OF THE INVENTION

This invention relates generally to energy harvesting and more particularly to an electromagnetic power generator for converting kinetic energy into electrical power. Kinetic energy harvesting is in area of much interest due to the ability to generate useful electrical energy by extracting mechanical energy in the form of vibrations. As the efficiency of these devices improves and the ability to produce increased useful electrical power increases, the need for batteries is reduced or eliminated in many applications. Numerous transducers have been developed to convert mechanical energy into electrical energy including piezo-electric and electro-magnetic. For electro-magnetic devices, a time varying magnetic field (flux) created by a vibrational source across the surface of a coil induces a potential and therefore current across the windings of the coil. The greater the flux density and flux gradient the larger the potential across the windings of the coil.

SUMMARY

A vibrational energy harvesting apparatus is disclosed herein that comprises a substrate; two magnets coupled to the substrate in close proximity to each other with like magnetic poles facing each other creating a flux gap; a coil coupled to the substrate and disposed within the flux gap, wherein the coil and the magnets are coupled to the substrate such that substrate acceleration causes relative motion between the magnets and the coil thereby exposing the coil to a changing magnetic flux.

The vibrational energy harvesting apparatus may be constructed as a micro-electro-mechanical system (MEMS) power generator comprising: a micro-fabricated substrate; two magnets coupled to the substrate in close proximity to each other with like magnetic poles facing each other creating a flux gap, wherein at least one of the magnets further comprises at least one through-hole thereby creating regions of high flux density in the flux gap around the at least one through-hole and the edges of the magnets; a plurality of micro-fabricated coils coupled to the substrate and disposed within the flux gap, wherein the coils and the magnets are coupled to the substrate such that substrate acceleration causes relative motion between the magnets and the coils thereby exposing the coils to a changing magnetic flux, and wherein at least one coil is positioned in each region of high flux density.

BRIEF DESCRIPTION OF THE DRAWINGS

For a more complete understanding of this invention, reference is now made to the following detailed description of the embodiments as illustrated in the accompanying drawings, in which like reference designations represent like features throughout the several views. The elements in the various figures are illustrative in nature and are not drawn to scale.

FIG. 1b is an expanded, cut-away, perspective view of the embodiment of the energy harvester depicted in FIG. 1a.

FIG. 8b is a top view showing multiple coils corresponding to the magnet shown in FIG. 8a.

FIGS. 9a-9c are cross-sectional views of different embodiments of the energy harvester.

DETAILED DESCRIPTION OF EMBODIMENTS

Disclosed herein is an improved vibrational energy harvester utilizing increased magnet edge area for increasing the flux density of the magnet and thereby increasing the potential and total power extracted as well as energy conversion efficiency of the energy harvester.

Figure 1A:
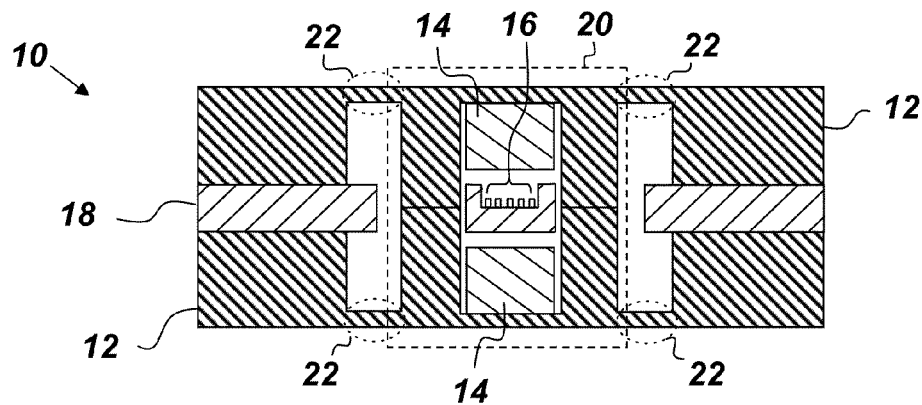
FIG. 1a is a cross-sectional view of one embodiment of the energy harvester.
Figure 1B:
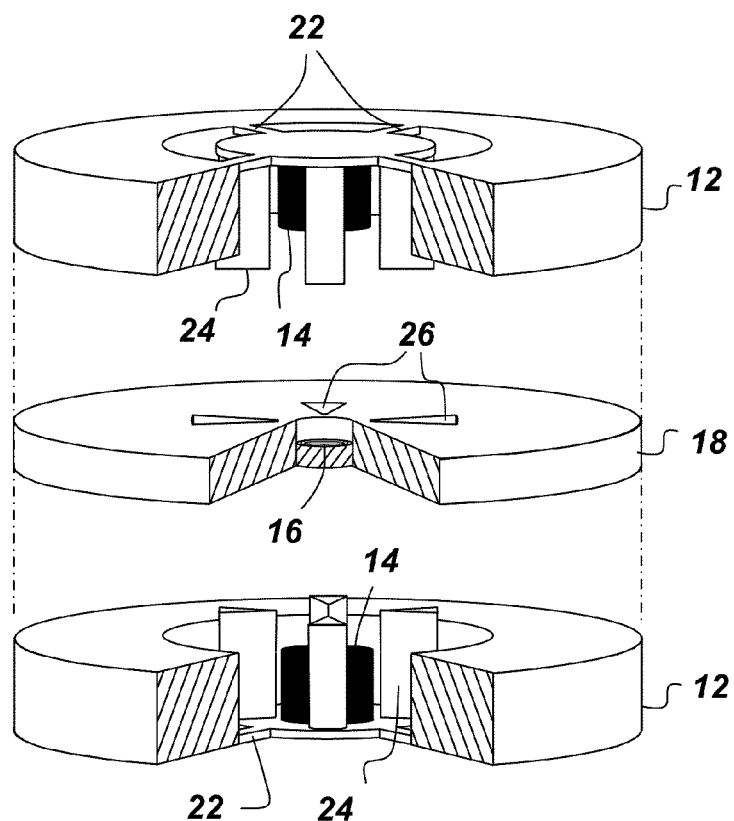

FIGS. 1a and 1b depict an embodiment of the vibrational energy harvester 10, the fabrication method of which is disclosed in the parent application. As shown in FIGS. 1a-1b, the energy harvester 10 comprises a substrate 12, two magnets 14, and a coil 16. The magnets 14 may be coupled to the substrate 12 in close proximity to each other with like magnetic poles facing each other. For example, the magnets 14 may be positioned with North poles opposing each other as shown in more detail in FIG. 2. The coil 16 may also be coupled to the substrate 12. The coil 16 and the magnets 14 are coupled to the substrate 12 such that any acceleration of the substrate 12 causes relative motion between the magnets 14 and the coil 16. In this way, the coil 16 is exposed to a changing magnetic flux. The magnets 14 may be any object capable of generating a magnetic field. A non-limiting example of a magnet 14 is a Neodymium permanent magnet.

In the embodiment of the energy harvester 10 shown in FIGS. 1a-1b, relative motion between the coil 16 and the magnets 14 is accomplished by mounting the coil 16 on a coil layer 18 which is firmly coupled to the substrate 12. The magnets 14 are then mounted to a carriage section 20 of the substrate 12 above and below the coil 16. The carriage 20 is elastically coupled to the rest of the substrate 12 via compliant regions 22, which allows limited vertical movement of the carriage 20 with respect to the coil layer 18 and the coil 16. Carriage 20 comprises bonding posts 24, which are aligned with bonding post through holes 26 in the coil layer 18. The bonding post through holes 26 are large enough to allow the bonding posts 24 to slip through without interference. In this manner, the carriage 20 straddles the coil 16 and is configured to elastically move in the vertical direction in response to acceleration of any other part of the substrate 12.

Figure 2:
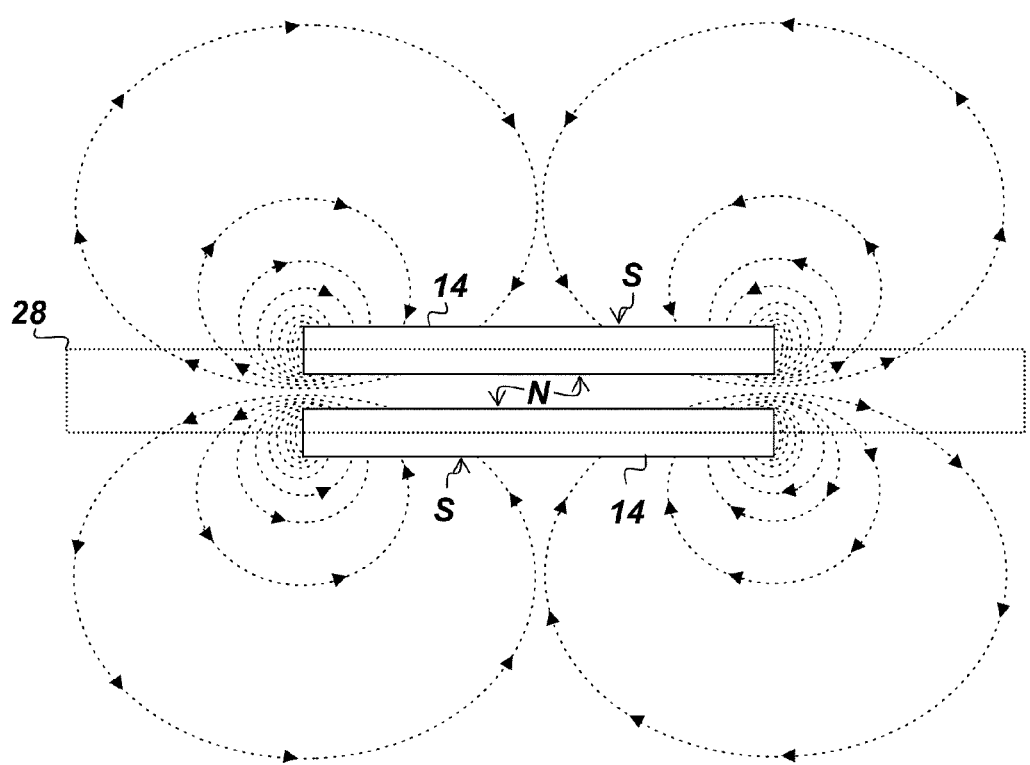
FIG. 2 is a diagram illustrating magnetic field lines generated by two magnets.

FIG. 2 is an edge view of two circular magnets 14 in close proximity to each other. Both magnets 14 have a North face and a South face. In FIG. 2, the North faces oppose each other, however, it is to be understood that the flux gap 28 may also be created with South Poles facing each other. With the magnets 14 in close proximity to one another and with like magnetic poles facing each other a flux gap 28 is created. In reference to the orientation of the magnets 14 shown in FIG. 2, the flux gap 28 may be defined as the region between the midpoints of the magnets 14 in the vertical direction and then laterally out to infinity. Although the box showing the flux gap 28 in FIG. 2 is shown with lateral boundaries, it is to be understood that this was done for illustration purposes only and that the lateral boundaries of the flux gap 28 extend to infinity. As can be seen in FIG. 2, there are regions of high flux density in the flux gap 28, particularly around the edges of the magnets 14.

Figure 3:
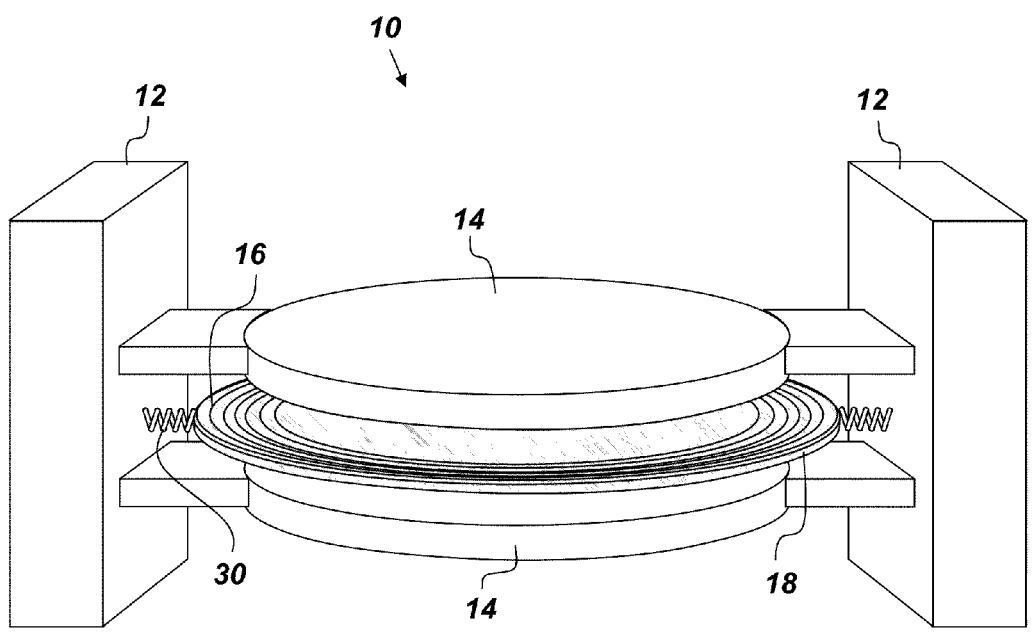
FIG. 3 is a perspective view of an embodiment of an energy harvester.

FIG. 3 is a perspective view of one embodiment of the energy harvester 10. In this embodiment, the magnets 14 are mounted rigidly to the substrate 12 in any useful manner while the coil 16 is mounted to the coil layer 18, which is elastically coupled to the substrate 12 via spring elements 30. In this embodiment, the windings of the coil 16 are positioned near the edges of the magnets 14 so as to be in the region of high flux density. Mass may be added to the coil layer 18 to increase its responsiveness to acceleration of substrate 12. The spring elements 30 may be a compliant section of the substrate 12 itself or any other element capable of elastic deformation.

Only the time varying magnetic flux gradient incident normal to the surface of the coil 16 can produce a potential. With regards to the energy harvester 10 shown in FIG. 3, the magnetic flux goes from no normal component (such as the midpoint of the magnetic flux gap 28) to an entirely normal component (as is the case when the coil 16 moves with regard to the magnets 14 and is positioned just off the bottom surface of the upper magnet 14 or the top surface of the lower magnet 14). A large portion of the flux coupling to the coil 16 is at the edge of the magnet where the flux density is the highest, as illustrated in FIG. 2. The flux gradient tapers off near the center of the magnets 14. In embodiments of the energy harvester 10 where the coil 16 extends to the center of the magnets 14, as shown in FIGS. 1*a*-1*b*, the inner windings of the coil 16, which are removed from the physical edges of the magnets 14 only contribute a small portion of the total flux coupling but also add extra resistance to the coil 16. Because the voltage is only marginally increasing as the windings increase and because the resistance of the coil 16 is increasing with more windings, it is possible for the total power produced by the energy harvester 10 to decrease as more windings are added to the coil 16. As shown in FIG. 3, the inner and outer diameters of the coil 16 may be adjusted to substantially maximize flux coupling while simultaneously minimizing total resistance of the coil 16.

Figure 4:
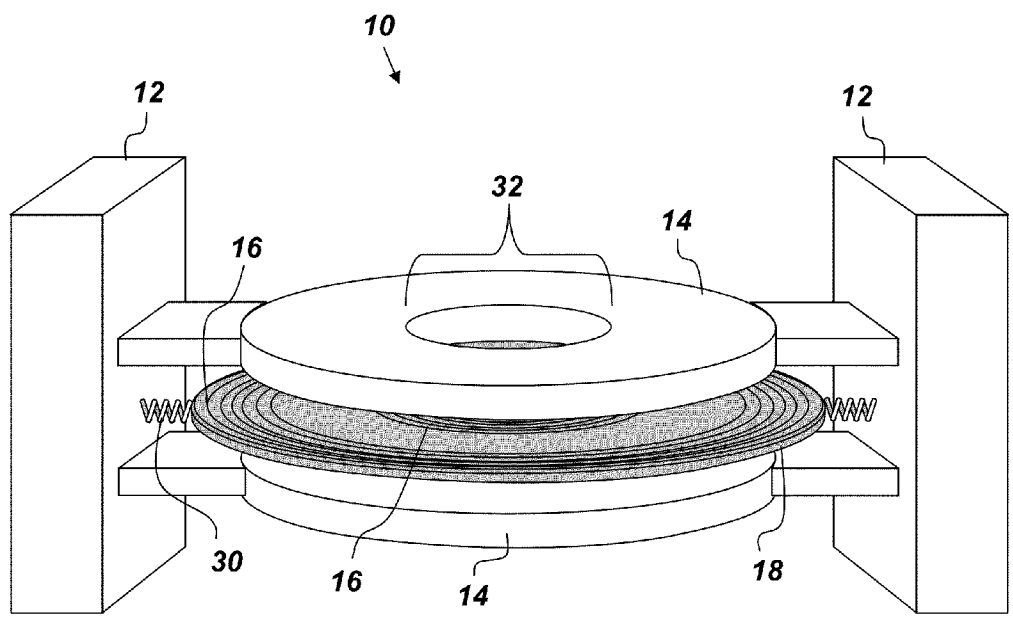
FIG. 4 is a perspective view of another embodiment of the energy harvester.

FIG. 4 is a perspective view of a depiction of another embodiment of the energy harvester 10. In this embodiment one of the magnets 14 further comprises a through-hole 32 thus increasing the total edge area of one of the magnets 14. FIG. 4 also shows that the coil 16 comprises two sets of windings, one in the high-flux-density region near the outer edges of the magnets 14 and another set of windings in the high-flux-density region created by the through-hole 32. In practice, the inner and outer sets of windings could be individual coils or part of the same coil. In the embodiment where the inner and outer sets of windings form individual coils, each coil may be wound in the same direction or different directions.

Figure 5A:
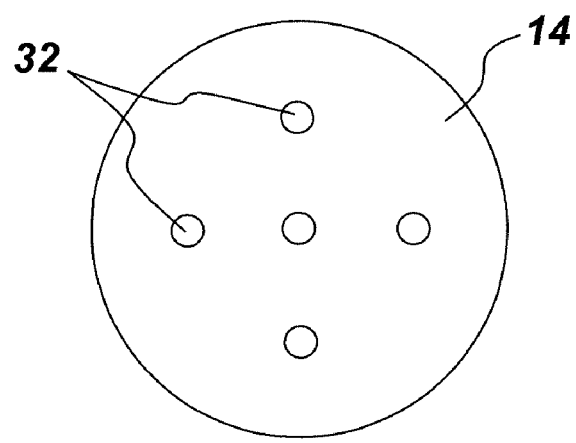
FIG. 5a shows a top view of a magnet with through-holes.
Figure 5B:
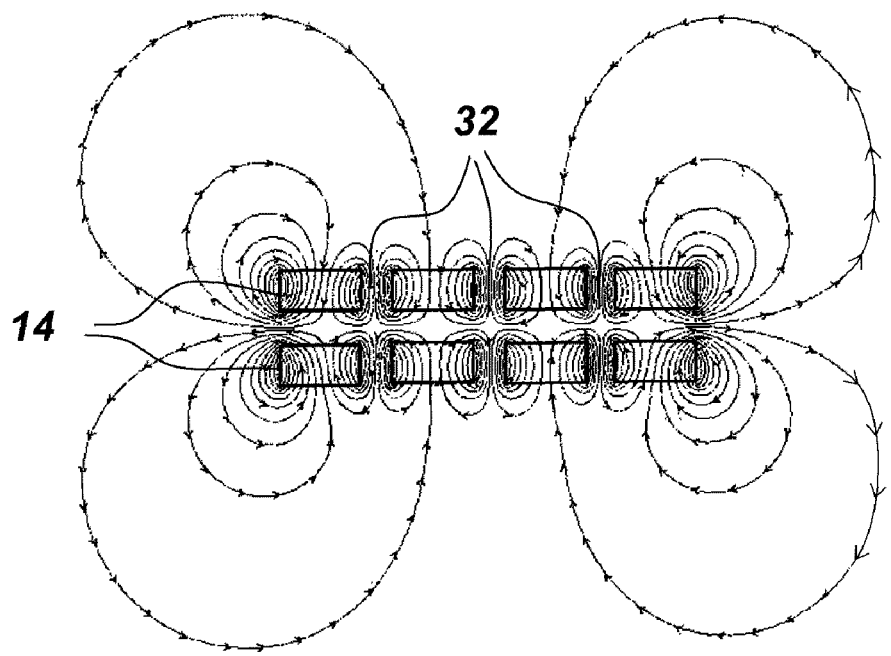
FIG. 5b shows the magnetic field lines generated by two magnets with through-holes.

FIG. 5*a* is a top view of a magnet 14 with a plurality of through-holes 32. Although the magnet 14 is depicted in FIG. 5*a* as having five through-holes 32, it is to be understood that each magnet 14 is not limited to five, but may have fewer or a greater number of through-holes 32. Each through-hole 32 increases the edge area of the magnet 14. The addition of through-holes 32 to at least one of the magnets 14 in the energy harvester 10 increases the number of high-flux-density regions in the flux gap 28, as shown in FIG. 5*b* below. More through-holes 32 may be added to each magnet 14 to further increase the edge area and magnetic flux density but at the expense of reduced mass and therefore reduced kinetic energy according to the equation $KE=\frac{1}{2}mv^2$; where KE is the kinetic energy, m is the mass of the magnet 14, and v is the velocity of the magnet 14. Additional mass may be added to the magnets 14 as desired.

FIG. 5*b* is a cross-sectional edge view of two magnets 14. Each magnet 14 in this embodiment has the same number and orientation of through-holes as the magnet 14 depicted in FIG. 5*a* and the through-holes 32 of both magnets 14 are coaxially aligned with each other. The flux gap 28 in the embodiment of the energy harvester 10 shown in FIG. 5*b* has an increased number of high-flux-density regions as compared to the hole-less embodiment of the energy harvester 10 depicted in FIG. 2. The energy harvester 10 is not limited to embodiments where both magnets 14 have the same number of through-holes 32 that are coaxially aligned with each other. Each magnet 14 may have any number of through holes 32, which need not be aligned with the through-holes 32, if any, in the other magnet 14. The through-holes 32 may be any desired size or shape.

Figure 6:
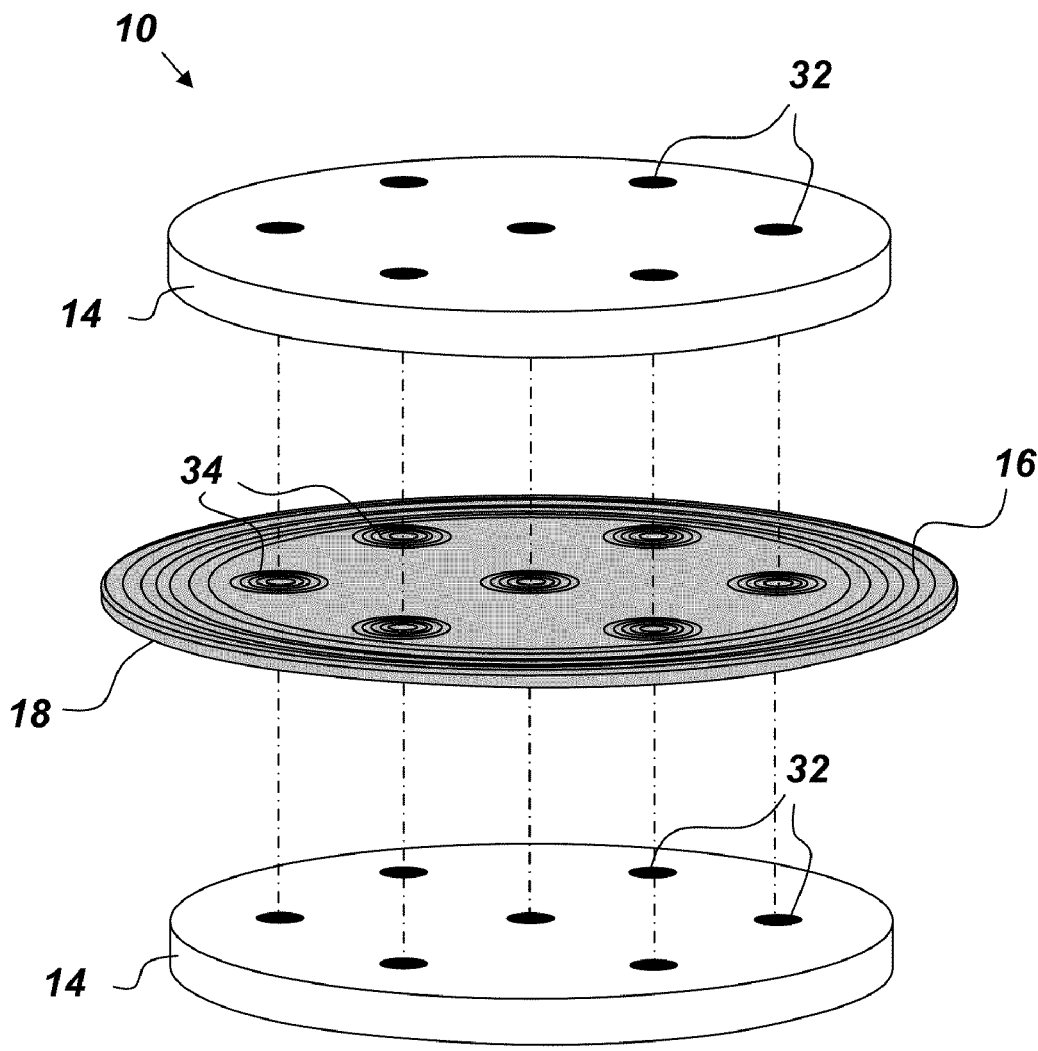
FIG. 6 is an expanded perspective view of one embodiment of the energy harvester.

FIG. 6 is an expanded perspective view of another embodiment of the energy harvester 10 further comprising a plurality of sub-coils 34 positioned in the flux gap 28. In the embodiment shown in FIG. 6, each sub-coil 34 is coaxially aligned with each set of coaxially aligned through-holes 32. The coil 16 and the sub-coils 34 are all disposed on the coil layer 18. Individual sub-coils 34 may be centered under each through-hole 32 in the magnet 14. In this manner, the coil 16 and the sub-coils 34 are located only in areas of the flux gap 28 where the flux gradient is largest. The coil 16 and the sub-coils 34 may be individual coils or part of the same coil.

Figure 7:
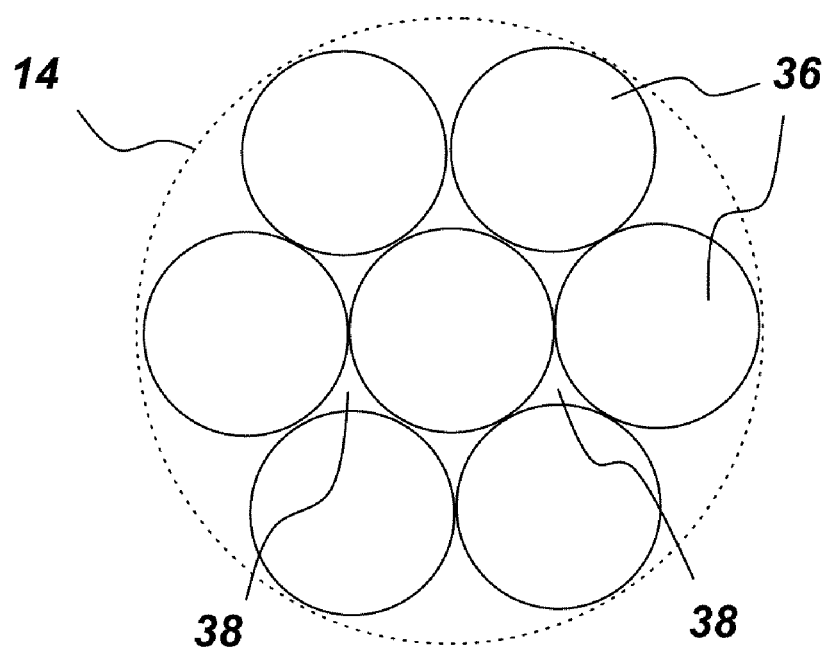
FIG. 7 is a top view of a magnet comprised of multiple sub-magnets.

FIG. 7 is a top view of an alternate embodiment of a single magnet 14 comprised of a plurality of polarly like-oriented sub-magnets 36. Each of the sub-magnets 36 is disposed in close proximity to each other with interstices 38 there-between. In this way, the flux density in the flux gap 28 is increased around all the interstices 38. The sub-magnets 36 and the interstices 38 may be any desired size or shape.

Figure 8A:
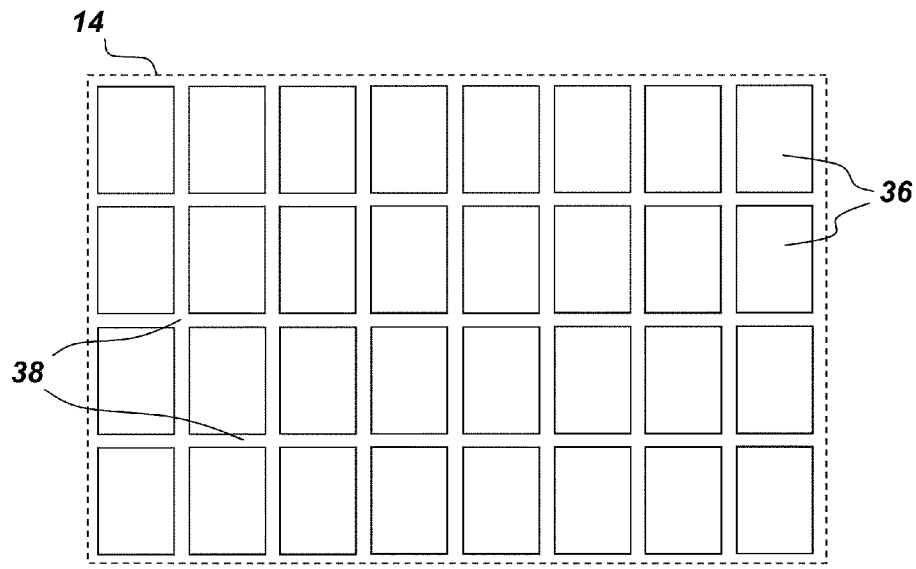
FIG. 8a is a top view of a magnet comprised of multiple sub-magnets.
Figure 8B:
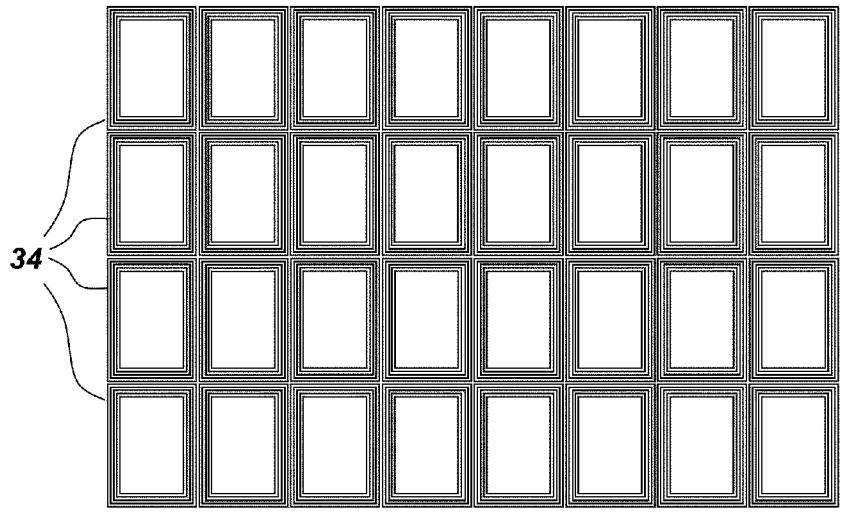

FIG. 8*a* is a top view of an alternate embodiment of a single magnet 14 comprised of a plurality of rectangular sub-magnets 36. FIG. 8b is a top view of an embodiment of the coil 16 that is shaped to correspond to the interstices 38 between the sub-magnets 36 shown if FIG. 8a. The coil shown in FIG. 8b can be one large coil 16 or a plurality of individual coils 34. As can be seen, in this embodiment, the contours of each sub-coil 34 substantially match the contours of the corresponding interstice 38.

Figure 9C:
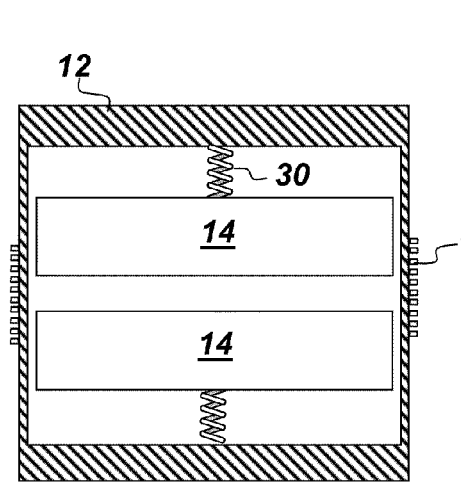
Figure 9C:
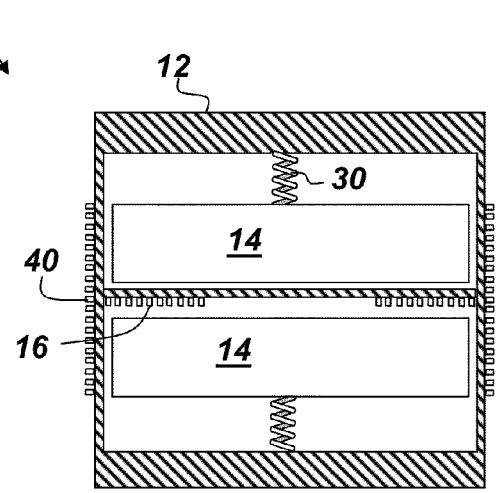
Figure 9C:
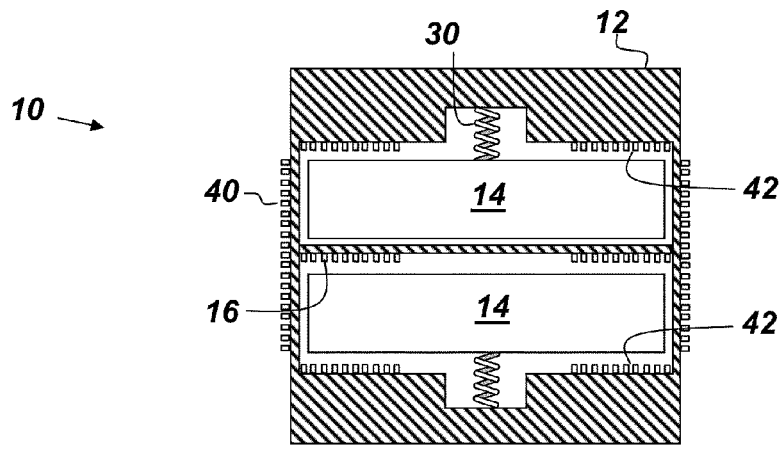

FIGS. 9a-9c show various cross-sectional views of alternate embodiments of the energy harvester 10. In FIG. 9a, the coil 16 is wrapped around the perimeter and along the lengths of the magnets 14. The magnets 14 may be rigidly coupled together or they may be allowed to move independently of each other. FIG. 9b illustrates an embodiment of the energy harvester 10 comprising a coil 16 and an edge coil 40. The edge coil 40 is wrapped around the edges of the magnets 14 over substantially the entire lengths of the magnets 14. FIG. 9c illustrates an embodiment of the energy harvester 10 comprising a coil 16, an edge coil 40 and two peripheral coils 42. In FIG. 9c, one peripheral coil 42 is disposed parallel to and in close proximity to each of the non-opposing faces of the magnets 14.

Figure 10A:
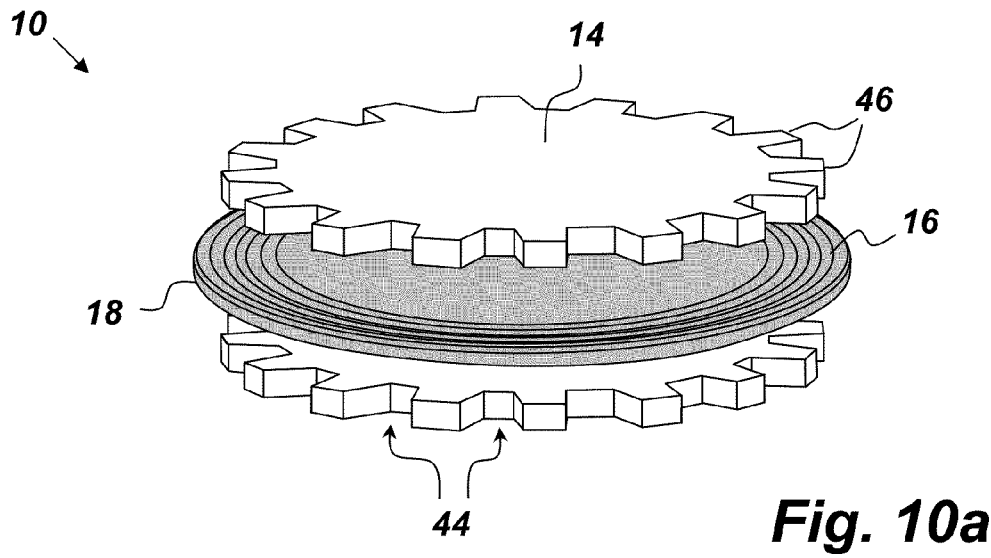
FIGS. 10a-10b are perspective views of alternate embodiments of the energy harvester.
Figure 10B:
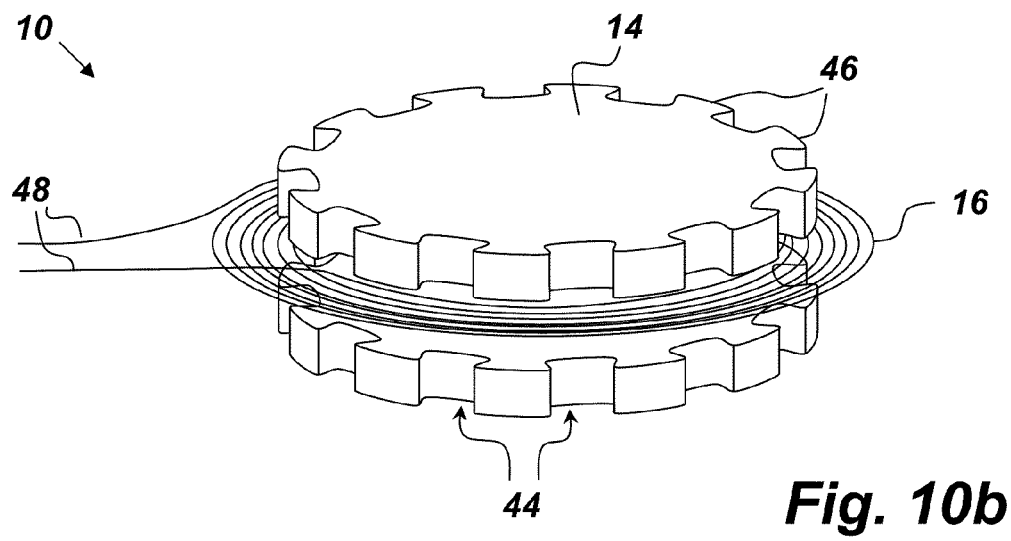

FIGS. 10a-10b are perspective views of alternate embodiments of the energy harvester 10 wherein the profile of at least one magnet 14 in the xy plane comprises edge-surface-area enhancements comprising alternating indentations 44 and protrusions 46 that increase the edge-surface area of the magnets 14. The protrusions 46 and indentations 44 can be any desired shape or size. In FIGS. 10a-10b, the edge-surface-area enhancements of each magnet 14 match and are aligned with each other. However, it is to be understood that FIGS. 10a-10b represent only two of many possible embodiments of the energy harvester 10 and that the edge-surface-area enhancements of the magnets 14 need not be matching or aligned. In the embodiment of the energy harvester 10 depicted in FIG. 10b, the coil 16 is self-supported in the flux gap 28 by electrodes 48, which are coupled in any useful manner to the substrate 12 (not shown).

Figure 11:
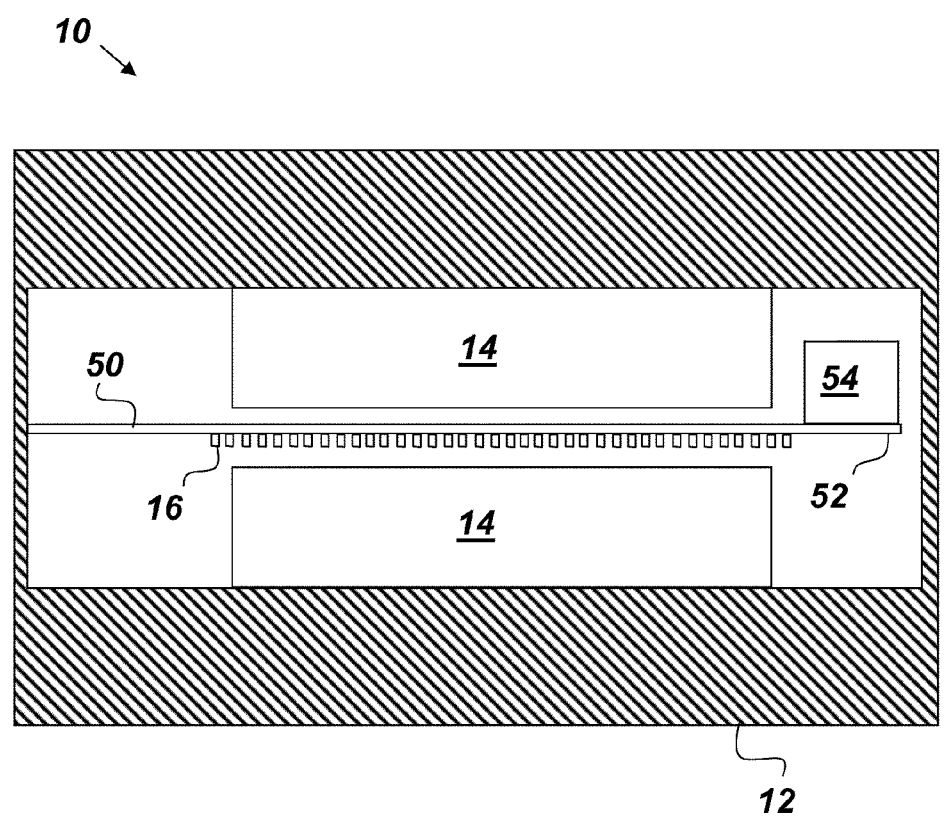
FIG. 11 is a cross-sectional view of another embodiment of the energy harvester.

FIG. 11 is a cross-sectional view of another embodiment of the energy harvester 10 where the coil 16 is coupled to the substrate 12 via a cantilevered beam 50. Attached to the distal end 52 of the beam 50 is a proof mass 54. In this configuration, acceleration of the substrate 12 causes the beam 50 to vibrate and thus generates potential in the coil 16.

The energy harvester 10 can be manufactured on the micro or macro scale. The coil 16 may be disposed on a micro-electro-mechanical spring mass system that is elastically coupled to a micro-fabricated substrate 12. A manner of micro-fabrication of the energy harvester 10 is presented in the parent application.

From the above description of the energy harvester 10, it is manifest that various techniques may be used for implementing the concepts of energy harvester 10 without departing from its scope. The described embodiments are to be considered in all respects as illustrative and not restrictive. It should also be understood that energy harvester 10 is not limited to the particular embodiments described herein, but is capable of many embodiments without departing from the scope of the claims.

We claim:

1. An energy harvester comprising:
   a substrate;
   two magnets coupled to the substrate in close proximity to each other with like magnetic poles facing each other creating a flux gap;
   a coil coupled to the substrate and disposed within the flux gap, wherein the coil and the magnets are coupled to the substrate such that substrate acceleration causes relative motion between the magnets and the coil thereby exposing the coil to a changing magnetic flux; and
   wherein at least one of the magnets comprises at least one through-hole.

2. The energy harvester of claim 1, wherein both magnets comprise a plurality of through-holes and wherein the through-holes of each magnet are coaxially aligned with the through-holes in the opposing magnet.

3. The energy harvester of claim 2, further comprising a plurality of sub-coils positioned in the flux gap, one sub-coil being coaxially aligned with each set of coaxial through-holes.

4. The energy harvester of claim 1, wherein the magnets are Neodymium permanent magnets.

5. The energy harvester of claim 1, wherein each magnet has a face disposed in a xy plane and a length in a z direction, and wherein the coil is wrapped around a perimeter of each face and along the lengths of the magnets.

6. The energy harvester of claim 1, wherein each magnet comprises a length in a z direction and two faces in an xy plane.

7. The energy harvester of claim 6, wherein the coil is disposed in the xy plane and extends into a space between the opposing faces of the two magnets.

8. The energy harvester of claim 7, further comprising an edge coil, wherein the edge coil is wrapped around the edges of the magnets over substantially the entire lengths of the magnets.

9. The energy harvester of claim 6, further comprising two peripheral coils, one peripheral coil disposed parallel to and in close proximity to each non-opposing face.

10. The energy harvester of claim 6, wherein the profile of at least one magnet in the xy plane comprises edge-surface-area enhancements comprising alternating indentations and protrusions.

11. The energy harvester of claim 10, wherein the profiles in the xy plane of both magnets comprise mutually-aligned and substantially matching edge-surface-area enhancements.

12. The energy harvester of claim 1, wherein the facing magnetic poles are both North poles.

13. The energy harvester of claim 1, wherein the coil is disposed on a micro-electro-mechanical spring mass system that is elastically coupled to the substrate.

14. The energy harvester of claim 13, further comprising a proof mass coupled to the coil.

15. An energy harvester comprising:
    a substrate;
    two magnets coupled to the substrate in close proximity to each other with like magnetic poles facing each other creating a flux gap;
    a coil coupled to the substrate and disposed within the flux gap, wherein the coil and the magnets are coupled to the substrate such that substrate acceleration causes relative motion between the magnets and the coil thereby exposing the coil to a changing magnetic flux; and
    wherein each magnet is comprised of a plurality of polarly like-oriented sub-magnets disposed in close proximity to each other with interstices there-between such that the flux density in the flux gap is increased.

16. The energy harvester of claim 15, further comprising a plurality of sub-coils positioned in the flux gap, one sub-coil being disposed near each interstice.

17. The energy harvester of claim 16, wherein the contours of each sub-coil substantially match the contours of the corresponding interstice.

18. A micro energy harvester comprising:
    a micro-fabricated substrate;

two magnets coupled to the substrate in close proximity to each other with like magnetic poles facing each other creating a flux gap, wherein at least one of the magnets further comprises at least one through-hole thereby creating regions of high flux density in the flux gap around the at least one through-hole and the edges of the magnets; and a plurality of micro-fabricated coils coupled to the substrate and disposed within the flux gap, wherein the coils and the magnets are coupled to the substrate such that substrate acceleration causes relative motion between the magnets and the coils thereby exposing the coils to a changing magnetic flux, and wherein at least one coil is positioned in each region of high flux density.

19. The micro energy harvester of claim 18, wherein the profile of at least one magnet comprises edge-surface-area enhancements comprising alternating indentations and protrusions.

\* \* \* \* \*